(12) United States Patent  
Yamagami

(10) Patent No.: US 7,600,087 B2  
(45) Date of Patent: Oct. 6, 2009

(54) DISTRIBUTED REMOTE COPY SYSTEM

(75) Inventor: Kenji Yamagami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 10/758,971

(22) Filed: Jan. 15, 2004

(65) Prior Publication Data

US 2005/0160248 A1    Jul. 21, 2005

(51) Int. Cl.
G06F 12/16    (2006.01)

(52) U.S. Cl. .......................... 711/162; 711/161; 714/5; 714/6

(58) Field of Classification Search ................. 711/162, 711/161; 714/5, 6
See application file for complete search history.

(56) References Cited

U.S. PATENT DOCUMENTS

| | | | |
|---|---|---|---|
| 5,086,502 A | | 2/1992 | Malcolm |
| 5,404,508 A | | 4/1995 | Konrad et al. |
| 5,446,871 A | | 8/1995 | Shomler et al. |
| 5,504,861 A | | 4/1996 | Crockett et al. |
| 5,734,818 A | | 3/1998 | Kern et al. |
| 6,301,677 B1 | | 10/2001 | Squibb |
| 6,408,370 B2 | | 6/2002 | Yamamoto |
| 6,658,540 B1 | | 12/2003 | Sicola et al. |
| 6,859,865 B2 * | | 2/2005 | De Margerie et al. ....... 711/162 |
| 7,133,984 B1 * | | 11/2006 | Dickensheets .............. 711/162 |
| 2002/0078296 A1 * | | 6/2002 | Nakamura et al. .......... 711/114 |
| 2002/0083262 A1 * | | 6/2002 | Fukuzumi .................... 711/103 |
| 2002/0122601 A1 * | | 9/2002 | Peng .......................... 382/250 |
| 2003/0014432 A1 | | 1/2003 | Teloh et al. |
| 2003/0028737 A1 * | | 2/2003 | Kaiya et al. ................. 711/162 |
| 2003/0074378 A1 | | 4/2003 | Midgley et al. |
| 2003/0188035 A1 | | 10/2003 | Lubbers et al. |
| 2003/0188229 A1 | | 10/2003 | Lubbers et al. |
| 2003/0198250 A1 * | | 10/2003 | Hakenberg et al. .......... 370/457 |

OTHER PUBLICATIONS

"Hitachi Freedom Storage Software Solutions Guide," Hitachi Data Systems Corporation Santa Clara, CA (Jan. 2003).
"Ascential Enterprise Integration Suite," product information Ascential Software Westboro, MA (2002).

* cited by examiner

Primary Examiner—Sanjiv Shah
Assistant Examiner—Jae U Yu
(74) Attorney, Agent, or Firm—Mattingly & Malur, PC

(57) ABSTRACT

Primary storage subsystems synchronously send write data to an intermediate storage system. Upon receiving the write data, the intermediate storage system 100c generates control data, which contains information to identifying the write order. In one embodiment, a portion of the control data, e.g., a sequence number, is generated and attached to the control data of the write data. The intermediate storage system sends the write data along with its control data to the secondary storage systems asynchronously. The secondary storage systems store the write data to the secondary volumes based on the control data. The write order is maintained using the sequence number generated by the intermediate subsystem.

14 Claims, 10 Drawing Sheets

DISTRIBUTED REMOTE COPY SYSTEM

BACKGROUND OF THE INVENTION

The present invention relates to a storage system, more particularly to a distributed storage system configured to perform a remote copy function.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Regardless of the type of storage system used, the data storage system users are acutely interested in maintaining back-up data in order to prevent loss of valuable data from failure in storage unit (or storage subsystem). Accordingly, the data storage systems generally includes back-up units to store data for emergency recovery when the primary units experience failure. The failure, however, may result from occurrence of natural disasters, e.g., earth quake or storm, in the area where the storage unit is provided, as well as from the break-down of the unit itself. If the back-up units are placed nearby the primary units, both of them may be destroyed when the natural disaster strikes. Accordingly, many storage system users prefer to place the primary units and the back-up units separated over along distance, e.g., over 100 miles apart. In fact, some users have even placed the primary and back-up units in different continents.

Currently, two operational modes are used by storage systems to copy the data to the back-up or secondary sites: synchronous mode and asynchronous mode. In synchronous mode, a write request from a host to the primary storage system completes only after write data are copied to the secondary storage system and acknowledge thereof has been made. Accordingly, this mode guarantees no loss of data at the secondary system since the write data from the host is stored in the cache of the primary system until the acknowledgement has be received from the secondary system. In addition, the primary volume (PVOL) in the primary storage system and the secondary volume (SVOL) in the secondary storage system are identically maintained, so that the SVOL can be used promptly used to replace the PVOL if the PVOL experiences failure. However, the primary and secondary storage systems cannot be placed too far apart, e.g., over 100 miles, under this mode. Otherwise, the storage system may not efficiently execute write requests from the host.

In asynchronous mode, a write request from a host to the primary storage system completes upon storing write data only to the primary system. The write data is then copied to the secondary storage system. That is, the data write to the primary storage system is an independent process from the data copy to the secondary storage system. Accordingly, the primary and secondary systems may be placed far apart from each other, e.g., 100 miles or greater. However, data may be lost if the primary system does down since the PVOL and SVOL identically maintained. Accordingly, it would be desirable to provide a data storage system or remote copy system that provides the benefits of the synchronous and asynchronous modes, i.e., enables the primary and secondary systems to be placed far apart while guaranteeing no data loss. An exemplary asynchronous remote copy method is disclosed in U.S. Pat. No. 6,408,370, to Yamamoto et. al, which is incorporated by reference.

BRIEF SUMMARY OF THE INVENTION

A remote copy system (or storage system that is configured to perform a remote copy function) may have one primary storage subsystem or two or more primary storage subsystems. A distributed remote copy system refers to a system having two or more primary storage subsystems. Data from the two or more primary subsystems are copied to two or more secondary storage subsystems of the distributed remote copy system for remote copy purposes. For example, a first primary subsystem is paired/mirrored with a first secondary subsystem, and a second primary subsystem is paired/mirrored with a second secondary subsystem.

Providing data integrity for such a remote copy system is a challenging task under currently available storage devices and technologies. A database associated with the primary storage subsystems generally writes log to record the data write order to guarantee the write order or data integrity. First log is written for a first primary subsystem, and second log is written for second primary subsystem. The first and second logs are used together to provide data integrity for the database at the primary subsystems. Similarly, the first and second logs need to be copied to the first and second secondary subsystems, respectively, to guarantee the write order at the secondary subsystems. The first and second logs would need to be copied to the secondary subsystems while maintaining relational information between the two logs in order to mirror the actual write order in the primary subsystems. However, this cannot be done easily since there is little or no collaboration between the first and second primary subsystems for remote copy purposes under the current technology.

As used herein, the term "storage system" refers to a computer system configure to store data and includes one or more storage units or storage subsystems, e.g., disk array units. Accordingly, the storage system may refer to a computer system including one or more hosts and one or more storage subsystems, or only a storage subsystem or unit, or a plurality of storage subsystems or units coupled to a plurality of hosts via a communication link.

As used herein, the term "storage subsystem" refers to a computer system that is configured to storage data and includes a storage area and a storage controller for handing requests from one or more hosts. The storage subsystem may be referred to as a storage device, storage unit, storage apparatus, or the like. An example of the storage subsystem is a disk array unit.

As used herein, the term "host" refers to a computer system that is coupled to one or more storage systems or storage subsystems and is configured to send requests to the storage systems or storage subsystems. The host may perform the functions of a server or client.

As used herein, the term "remote copy system" refers to a computer system that is configured to perform a remote copy function. The remote copy system may refer to a single storage system, subsystem or unit, or a plurality of storage units, systems, or subsystems that are linked by a network or communication link. Accordingly, the remote copy system may refer to a primary storage system, a secondary storage system, an intermediary system, or a combination thereof. The remote copy system also may include one or more hosts.

In one embodiment, a primary storage subsystems synchronously send write data to an intermediate storage system. Upon receiving the write data, the intermediate storage system 100c generates control data, which contains information to identifying the write order. In one embodiment, a portion of the control data, e.g., a sequence number, is generated and attached to the control data of the write data. The intermediate storage system sends the write data along with its control data to the secondary storage systems asynchronously. The secondary storage systems store the write data to the secondary volumes based on the control data. The write order is maintained using the sequence number generated by the intermediate subsystem.

In one embodiment, a remote copy system includes first and second primary storage subsystems, the first primary storage subsystem including a first primary volume, the second primary storage subsystem including a second primary volume, the first and second primary volumes storing a plurality of write data in a given order; an intermediate storage subsystem configured to receive the write data from the first and second primary storage subsystems, the intermediate storage subsystem including a write-order-information provider that is configured to generate write-order information for the write data received from the first and second primary storage subsystems, the write order information being associated with the write data received from the first and second primary storage subsystems, the write order information reflecting the given order of storage of the write data in the first and second primary storage subsystems; and first and second secondary storage subsystems configured to receive the write data from the intermediate storage subsystem, the first secondary storage subsystem including a first secondary volume that is configured to mirror the first primary volume, the second secondary storage subsystem including a second secondary volume that is configured to mirror the second primary volume, wherein the write data are stored in the first and second secondary storage subsystems according to the write order information associated with the write data.

In another embodiment, an intermediate storage subsystem provided in a remote copy system and coupled to a plurality of primary storage subsystems and a plurality of secondary subsystems includes a first storage area configured to receive write data from at least one primary subsystem, the write data being received synchronously from the at least one primary subsystem; and a write-order-information provider configured to generate write order information for the write data received from the at least one primary subsystem, the write order information being associated with the write data. The write order information is used to store the write data in at least one of the secondary subsystems, so that the at least one secondary subsystem mirrors the at least one primary subsystem.

In another embodiment, a method for operating a remote copy system includes receiving first write data from a first primary storage subsystem at an intermediate storage subsystem, the first write data being sent by the first primary subsystem synchronously; associating first write order information to the first write data; receiving second write data from a second primary storage subsystem at the intermediate subsystem, the second write data being sent by the second primary subsystem synchronously; associating second write order information to the second write data; transmitting asynchronously the first write data and the first write order information to a first secondary storage subsystem; and transmitting asynchronously the second write data and the second write order information to a second secondary storage subsystem, wherein the first and second write data are stored in the first and second secondary subsystems, respectively, according to the first and second write order information.

In yet another embodiment, a computer readable medium comprising a computer program for operating a remote copy system includes code receiving first write data from a first primary volume of a first primary storage subsystem at an intermediate storage subsystem, the first write data being sent synchronously by the first primary subsystem; code for associating first write order information to the first write data; code for receiving second write data from a second primary volume of a second primary storage subsystem at the intermediate subsystem, the second write data being sent synchronously by the second primary subsystem; code for associating second write order information to the second write data; code for transmitting asynchronously the first write data and the first write order information to a first secondary storage subsystem, the first secondary subsystem including a first secondary volume; and code for transmitting asynchronously the second write data and the second write order information to a second secondary storage subsystem, the second secondary subsystem including a second secondary volume. The first and second write data are stored in the first and second secondary subsystems, respectively, according to the first and second write order information, so that the first and second secondary volumes mirror the first and second primary volumes.

In yet another embodiment, an intermediate storage subsystem provided in a distributed remote copy system includes means for receiving write data from first and second primary volumes of first and second primary subsystems, the first primary volume being defined in the first primary subsystem, the second primary volume being defined in the second primary subsystem, the write data being received synchronously from the primary subsystems; and means for generating write order information for the write data received from the primary subsystems, the write order information being associated with the write data, the write order information providing information as to a write order of the write data. The write order information is used to store the write data in the first and second secondary volumes of first and second secondary subsystems, the first secondary volume being defined in the first secondary subsystem, the second secondary volume being defined in the second secondary subsystem. The first and second secondary volumes mirror the first and second primary volumes.

DETAILED DESCRIPTION OF THE INVENTION

Figure 1A:
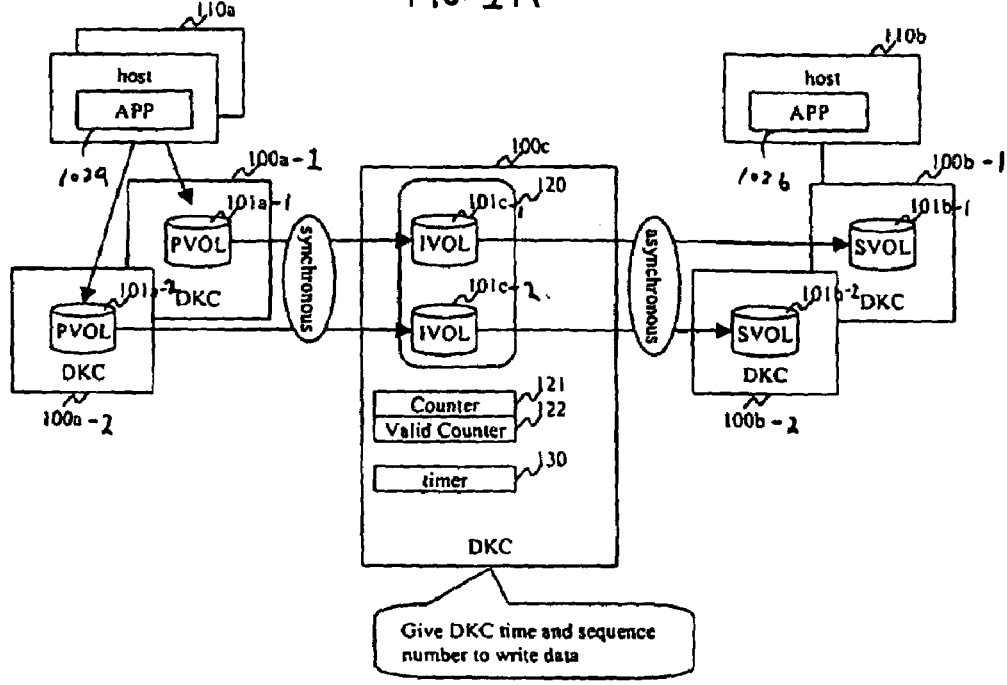
FIG. 1A illustrates a remote copy system having a plurality of primary storage systems or subsystems according to one embodiment of the present invention.

FIG. 1A illustrates a remote copy system 50 having a plurality of primary storage systems or subsystems 100a according to one embodiment of the present invention. The remote copy system is an exemplary distributed remote copy system and is configured to maintain data integrity across at the secondary storage subsystems.

The system 50 includes a plurality of primary storage subsystems 100a, a plurality of secondary storage subsystems 100b, and an intermediate storage subsystem 100c. The primary storage subsystems includes first and second primary storage subsystems 100a-1 and 100a-2. The secondary storage subsystems includes first and second secondary storage subsystems 100b-1 and 100b-2. In one implementation, a single intermediate subsystem is used.

In the present embodiment, the primary subsystems copies data to the intermediary subsystem synchronously, and the intermediate subsystem copies the data to the secondary subsystems asynchronously. The intermediate storage subsystem 100c is located close to the primary subsystems 100a and far away from the secondary subsystems 100b. For example, the primary and intermediate subsystems are within 10 miles of each other, and the intermediate and second subsystems are more than 100 miles apart from each other. In one implementation, the primary and intermediary subsystems are provided within the same building or complex.

Figure 1B:
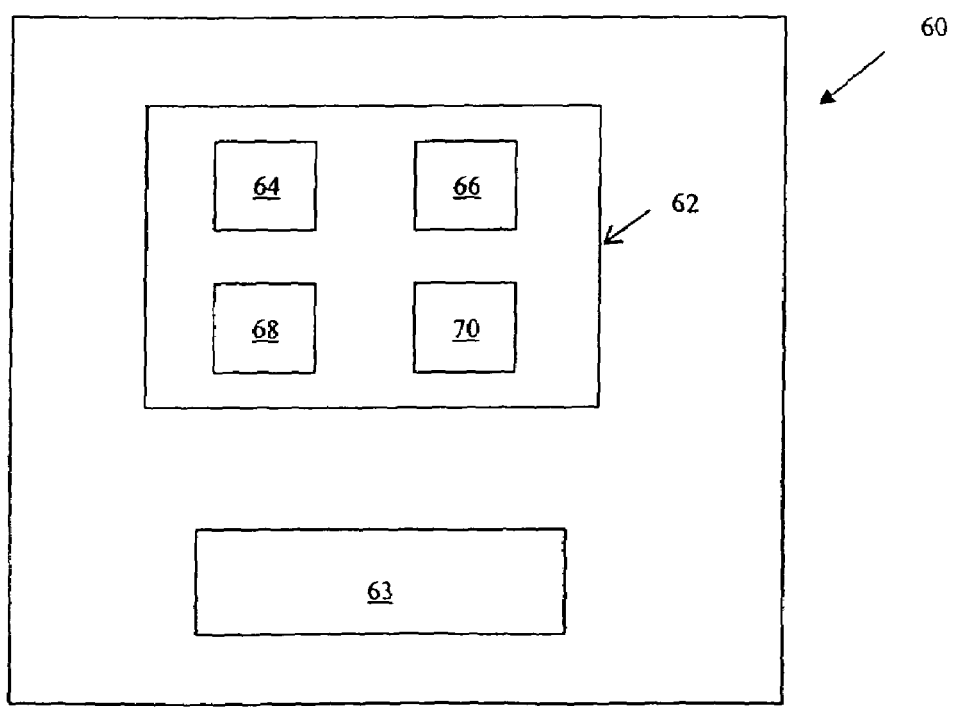
FIG. 1B illustrates an exemplary storage subsystem including a storage controller configured to handle data read/write requests and a storage unit including a recording medium for storing data in accordance with write requests.

FIG. 1B illustrates an exemplary storage subsystem 60 including a storage controller 62 configured to handle data read/write requests and a storage unit 63 including a recording medium for storing data in accordance with write requests. The controller 62 includes a host channel adapter 64 coupled to a host computer, a subsystem channel adapter 66 coupled to another subsystem, and a disk adapter 68 coupled to the storage unit 63 in the storage subsystem 60. In the present embodiment, each of these adapters includes a port (not shown) to send/receive data and a microprocessor (not shown) to control the data transfers via the port.

The controller 62 also includes a cache memory 70 used to temporarily store data read from or to be written to the storage unit 63. In one implementation, the storage unit is a plurality of magnetic disk drives (not shown).

The subsystem provides a plurality of logical volumes as storage areas for the host computers. The host computers use the identifiers of these logical volumes to read data from or write data to the storage subsystem. The identifiers of the logical volumes are referred to as Logical Unit Number ("LUN"). The logical volume may be included in a single physical storage device or a plurality of storage devices. Similarly, a plurality of logical volumes may be associated with a single physical storage device. A more detailed description of storage subsystems is provided in U.S. patent application Ser. No. 10/394,631, entitled "Data Storage Subsystem," filed on Mar. 21, 2003, claiming priority to Japanese Patent Application No. 2002-163705, filed on Jun. 5, 2002, assigned to the present Assignee, which is incorporated by reference.

Referring back to FIG. 1A, the remote copy system 50 also includes a primary host 110a and a secondary host 110b. The hosts send read and write data requests to the respective storage subsystems. The primary host includes an application program 102a to access volumes of the primary subsystems. The secondary host includes an application program 102b to access volumes of the secondary subsystems. When either the primary host 110a or the primary subsystem 100a (or both) becomes unavailable, the application program 102a fails over to the secondary host 110b in order to continue making the database available to the enterprise business.

Each of the storage subsystems includes volumes to store data. The primary subsystem includes primary volumes or PVOLs 101a. The primary volumes stores production data that the primary host access. The primary volumes includes first and second PVOLs 101a-1 and 101a-2. The secondary subsystem include secondary volumes or SVOLs 101b. The secondary volumes store back-up data of the production data of the PVOLs. The secondary volumes include first and second SVOLs 101b-1 and 101b-2. The intermediate subsystem includes intermediate volumes or IVOLs 101c. The intermediate volumes are temporarily store a copy of the production data to be in the secondary volumes. Accordingly, the intermediate volumes are "secondary volumes" to the primary volumes 101a and "primary volumes" to the secondary volumes 101b. The intermediate volumes includes first and second IVOLs 101c-1 and 101c-2.

A consistency group 120 is provided or defined in the intermediate subsystem 100c. The consistency group is a set of volumes for which data integrity is guaranteed. A user typically defines a consistency group for volumes that store data associated with a given application, e.g., a database, with which data integrity is desired.

A timer 130 is included in the intermediate storage subsystem 100c to provide timing information to data requests. For example, the timer attaches a timestamp to a control data of a write request received from primary storage subsystem 100a. The write request generally includes data to be written to a given storage location as well as the address of the storage location. Generally, the write request includes data to be written (or write data) and header or administrative information associated with the write data. The control data provides administrative information associated with a given request (read or write) and may also be considered as part of a header of the request.

A counter 121 is included in the intermediate storage subsystem 100c to attach a sequence number to the control data when a write request is received from the primary storage subsystem 100a. The sequence number is used to keep track of the write order. Generally, each consistency group 120 has its own counter 121 to keep track of the write order for that consistency group or database. Generally, the intermediate subsystem receives the control data or header with the write data, and the sequence number is attached to the control data/header.

The timestamp or the sequence number or both may be used to maintain the write order of the write data at the secondary subsystems to reflect the write order as in the primary storage subsystem 100a. In the present invention, the sequence number is used to guarantee the write order.

A valid counter 122 is included in the intermediate subsystem 100c to store the most recent sequence number that is ready for validating at the secondary storage subsystem 100b.

Figure 5:
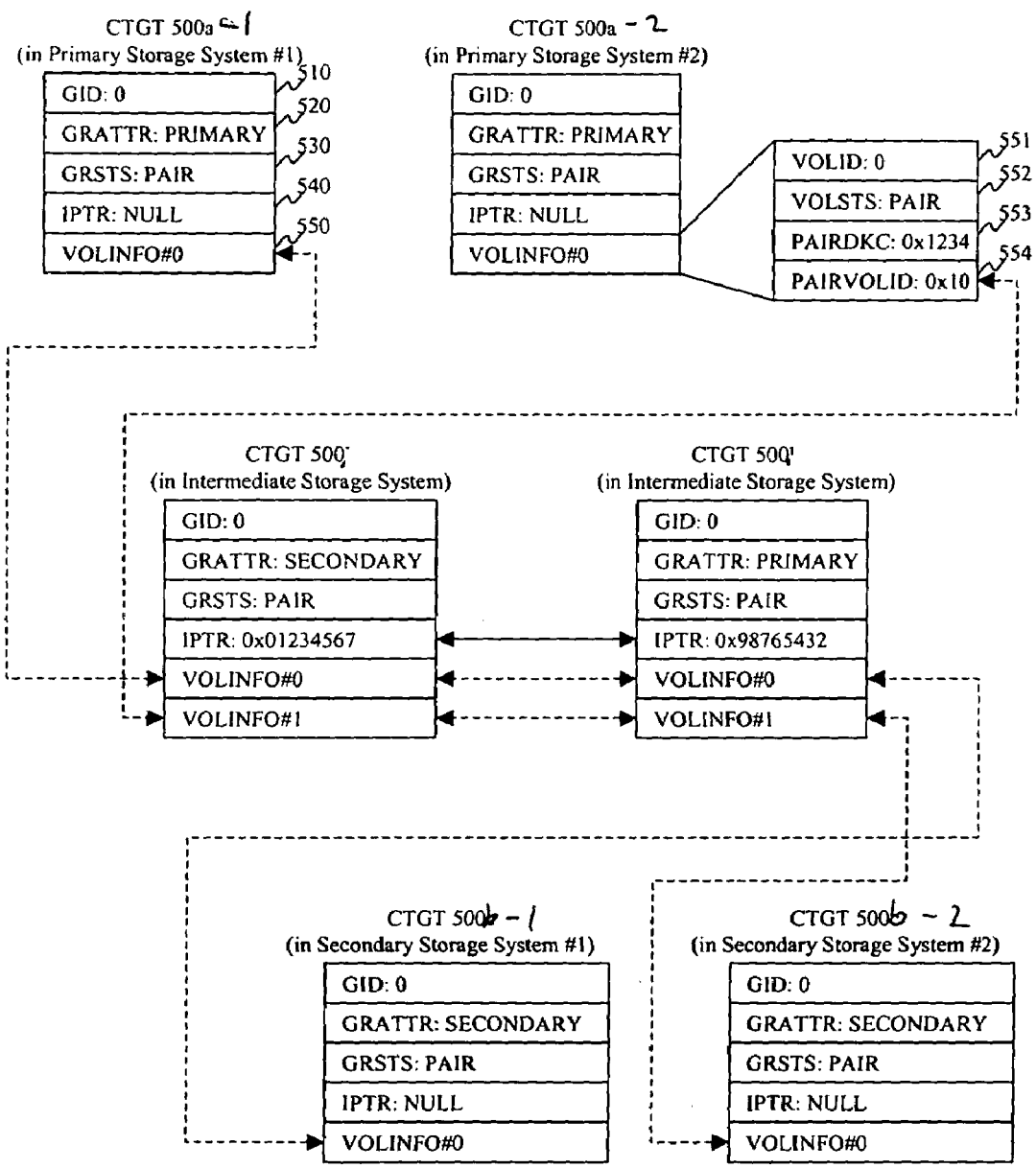
FIG. 5 illustrates the following mirror configuration for the remote copy system according to one embodiment.

Referring to FIG. 5, each storage subsystem includes a consistency group table that stores information relating to pair relationship between volumes. The primary subsystem 101a includes primary consistency group tables 500a, a first table 500a-1 for the first primary subsystem and a second table 500a-2 for the second primary subsystem. The intermediate subsystem 101c includes first and second intermediate consistency group tables 500c-1 and 500c-2. The secondary subsystem 101b includes secondary consistency group tables 500b, a first table 500b-1 for the first secondary subsystem and a second table 500b-2 for the second secondary subsystem.

Each of the consistency group table includes a group ID field or GID 510, a group attribute field or GRATTR 520, a group status field or GRSTS 530, a intermediate pointer field or IPTR 540, and a volume information field or VOLINFO# 550.

GID 510 stores identification information of the consistency group. The identification information is generally a unique number in the given storage subsystem. GID 510 is used to identify paired consistency groups. For example, two consistency groups are referred to as being paired if the respective GID fields contain the same value.

GRATTR 520 indicates whether the group functions as primary volumes or secondary volumes. For example, the consistency groups in the primary and secondary subsystems would indicate PRIMARY and SECONDARY, respectively. PRIMARY indicates the consistency group is a source or sender of data, whereas SECONDARY indicates the consistency group is a destination or recipient of the data. Accordingly, the consistency group tables 500c in the intermediate subsystem indicates SECONDARY for the first group table 500c-1 associated with the primary group and PRIMARY for the second group table 500c-2 associated with the secondary group.

GRSTS 530 stores status of the consistency group. Generally, the consistency group is in a copy (COPY), pair (PAIR), or suspend (SUSP) state. The copy state indicates that data is currently being copied from one volume (e.g., PVOL) to another volume (e.g., SVOL). The pair state indicates that a first volume (e.g., PVOL) and a second volume (e.g., SVOL) contain the same information; i.e., they have been paired to mirrored. The suspend state indicate that copying of data from a first volume (e.g., PVOL) to a second volume (e.g., SVOL) has been suspended.

IPTR 540 contains a pointer to the paired consistency group tables in the intermediate subsystem. The tables in the intermediate subsystem include appropriate values that associate the first table 500c-1 and second table 500c-2. That is, IPTR 540 for the first able 500c-1 points to the second table 500c-2, and IPTR 540 for the second table 500c-2 points to the first table 500c-1. This field is NULL for tables in the primary and second subsystems since each primary or secondary subsystem generally only include one consistency group table.

VOLINFO# 550 stores volume information. One area is allocated for one volume. A volume identifier field (VOLID 551) identifies a volume identifier in a given storage subsystem 100. Each volume has a unique number with its storage subsystem 100. A volume status field 552 (VOLSTS 552) indicates the state of the volume, e.g., COPY, PAIR, or SUSP. A serial number field (PAIRDKC 553) stores identifier or serial number of the paired storage subsystem 100. Each storage subsystem 100 has a unique number. A pair volume field (PAIRVOL 554) stores a volume identifier in the paired storage subsystem 100 identified by PAIRDKC 553.

FIG. 5 illustrates the following mirror configuration for the remote copy system 50 according to one embodiment. Each of the primary storage subsystems includes a single PVOL. Each primary storage subsystem 100a has a consistency group table, where:

GID=0,

GRATTR=PRIMARY, indicating that the volume is PVOL,

The CTG contains just one PVOL, as reflected in VOLINFO#0,

IPTR=NULL to indicate this CTG is not defined in IVOL101c.

Each of the secondary storage subsystems 100b includes a single SVOL. Each secondary storage subsystem 100c has a consistency group table, where:

GID=0, the same GID as stored in the consistency group table of the intermediate storage subsystem 100c, GRATTR=SECONDARY indicating that the volumes is SVOL, This CTG contains just one SVOL, as reflected in VOLINFO#0

IPTR=NULL to indicate that this CTG is not defined in IVOL101c

The intermediate storage subsystem 100c couples to the primary storage subsystems 100a and secondary storage subsystems 100b. The intermediate storage subsystem 100c has two consistency group tables, where:

GID=0, the same GID as is stored in the consistency group table of the primary storage subsystem 100a, GRATTR=PRIMARY for the first table 500c-1 and SECONDARY for the second table 500c-2, each table includes two volume information fields, VOLINFO#0 and VOLINFO#1

IPTR points to a corresponding group table in IVOL 101c.

Figure 2:
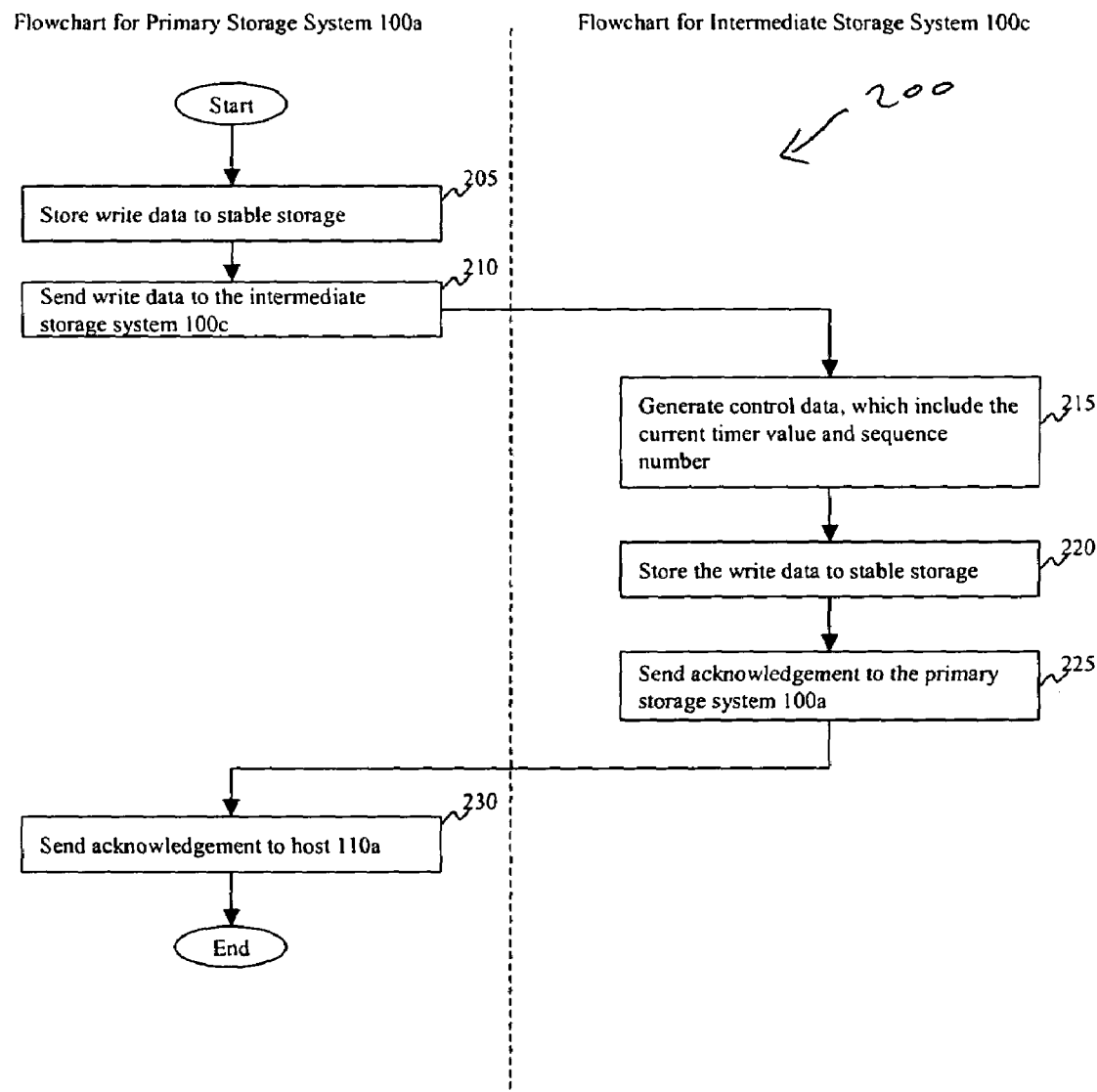
Referring to FIG. 2, a process relating to a synchronous remote copy method according to one embodiment of the present invention is performed between the primary subsystems and the intermediate subsystem.

Referring to FIG. 2, a process 200 relating to a synchronous remote copy method according to one embodiment of the present invention is performed between the primary subsystems and the intermediate subsystem. The process 200 is invoked when a write request arrives from the primary host 110a to the primary storage subsystem 100a.

At step 205, when the primary storage subsystem receives a write request, it stores the write data to a non-volatile storage area (or stable storage area). The non-volatile storage area may be a cache memory or a storage area allocated on a magnetic disk for temporarily storage of the write data. The primary subsystem system then sends the write data to the intermediate storage subsystem 100c and wait for the acknowledgement from the intermediate storage subsystem 100c (step 210). When the intermediate storage subsystem 100c receives write data from the primary storage subsystem 100a, it generates at least a portion of control data of the write data (step 215). In the present embodiment, the generation step involves generating and attaching a sequence number to the header of the write request. A timestamp may also be attached to the header.

In one embodiment, the control data includes a serial number 291 (or PVOL-ID 291), a write address 292 (or ADDR 292), a length 293 (or LEN 293), a time 294, and a sequence number (SEQ 295). PVOL-ID 291 identifies the primary storage subsystem and the PVOL within the primary subsystem. The primary subsystem and PVOL are identified using serial numbers.

ADDR 292 indicates the starting location of the write address on PVOL, so that data may be written starting from that location. LEN 293 indicates the length of the write data. Accordingly, ADDR 292 and LEN 293 together define the exact address of the write data.

Time 294 is a timestamp attached to the control data when the write request arrives from the primary storage subsystem 100a to the intermediate storage subsystem 100c. The timestamp is provided by the timer 130 of the intermediate storage subsystem 100c.

SEQ 295 is a sequence number assigned to the write request. This value is provided by the counter 121 associated with a given consistency group in the intermediate storage subsystem 100c. The steps includes obtaining a value from the counter 121, storing the obtained value +1 to counter 121 (i.e., increment the counter by 1), and attaching the obtained value to the control data of the write request.

Referring back to the process 200, the intermediate storage subsystem 100c stores the write data from the primary storage subsystem 100a and its control data to a non-volatile or stable storage area (step 220). A first acknowledgement is send to the primary storage subsystem 100a (step 225). The first acknowledgement indicates that the write data has been copied to the intermediate subsystem. The data in the non-volatile storage area is subsequently stored to IVOL 101c for a longer term storage. The primary storage subsystem 100a sends a second acknowledgement to the primary host 110a (step 230). As illustrated, the process 200 is a synchronous copy operation since the second acknowledgement to the primary host is not provided by the primary subsystem until the first acknowledgement has been received by the primary subsystem.

Figure 3:
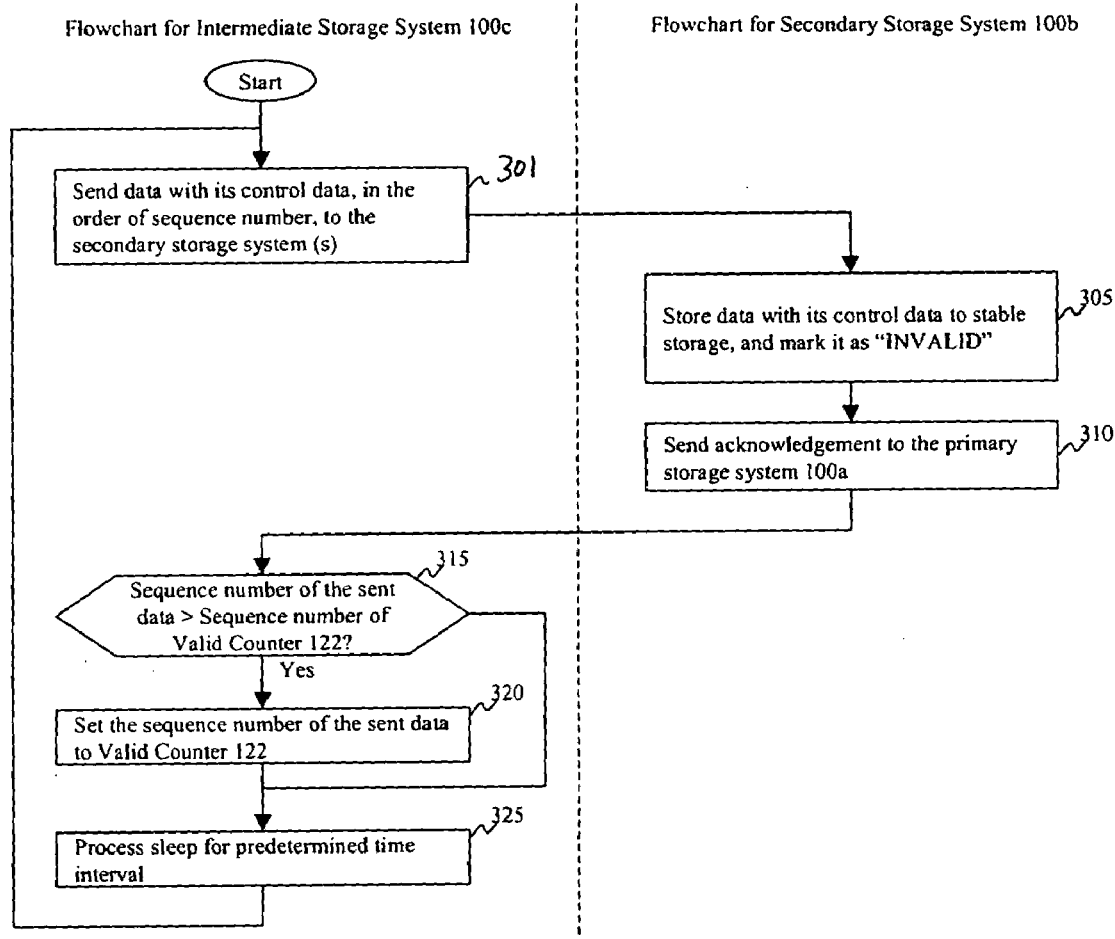
FIG. 3 illustrates a process relating to an asynchronous remote copy operation between the intermediate subsystem and the secondary subsystem according to one embodiment of the present invention.

FIG. 3 illustrates a process 300 relating to an asynchronous remote copy operation between the intermediate subsystem 100c and the secondary subsystem 100b according to one embodiment of the present invention. One feature of the process 300 is to maintain the write order of the data received at the secondary storage subsystems 100b according to the write order as provided by the primary host 110a to the primary subsystems 100a. This guarantee of data integrity involves indicating the write data received at the secondary subsystem as INVALID and subsequently validating it. The validation process is described in connection with FIG. 4.

The process 300 is periodically invoked at a predetermined time interval, e.g., every ten seconds. Write data and its control data stored in the non-volatile storage area of the intermediate storage subsystem 100c are send to the secondary storage subsystem 100b (step 301). The write data are selected according to ascending value of SEQ 295 of its corresponding control data according to the present embodiment.

The secondary storage subsystem 100b stores the write data and its control data and marks the data as "INVALID" (step 305). The secondary subsystem sends an acknowledgement to the intermediate storage subsystem 100c (step 310).

Upon receiving the acknowledgement, the intermediate storage subsystem 100c determines whether the current value of the valid counter 122 is less than SEQ 295 of the control data that has been sent (step 315). If so, the value is updated (step 320). The process 300 then sleeps for a predetermined time until it is invoked again (step 325). The valid counter 122 thus keeps the latest sequence number with which the write data can be validated on the secondary storage subsystem 100b. In other words, the valid counter keeps the value of the highest sequence number of the INVALID data (data waiting to be validated) stored in the secondary subsystem.

Figure 4:
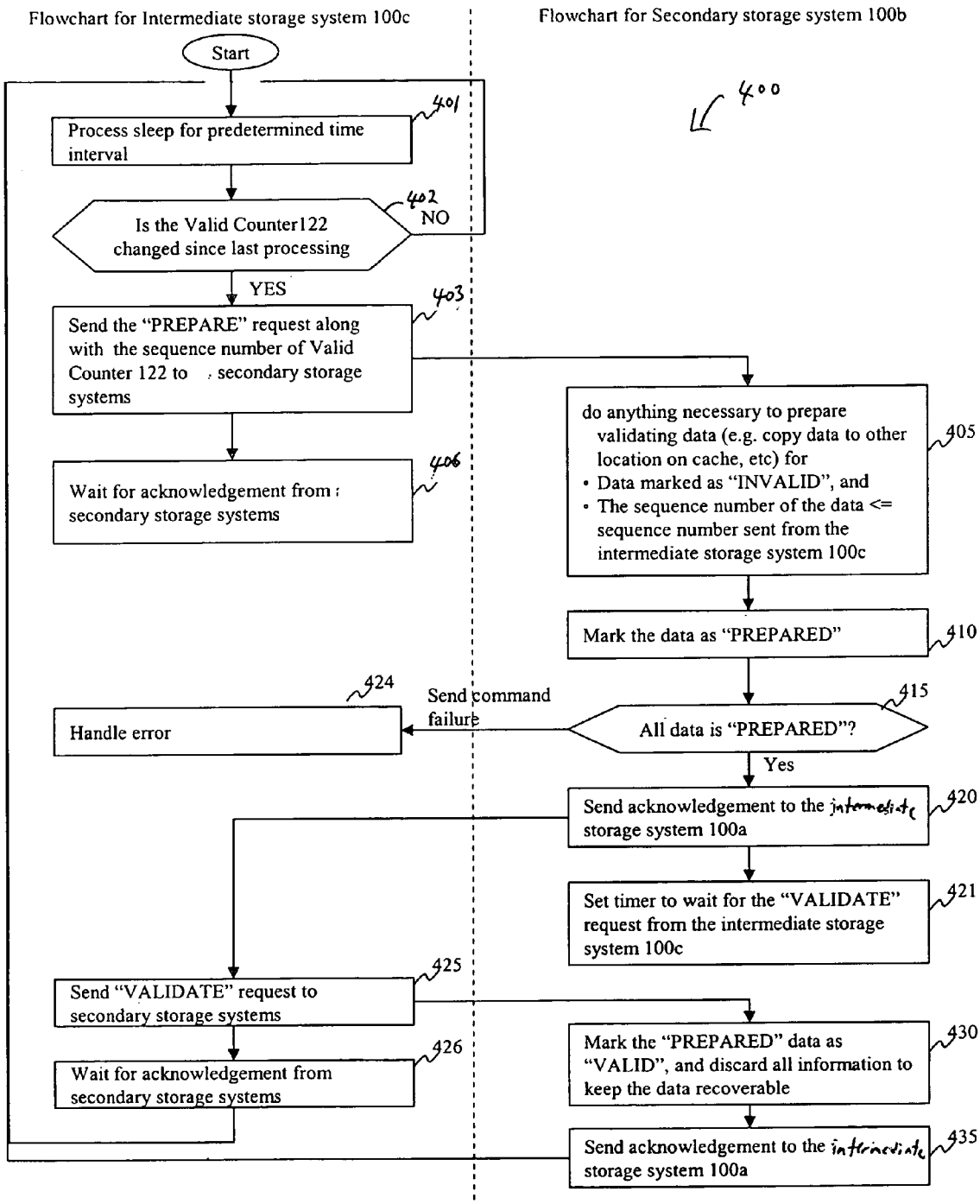
FIG. 4 illustrates a process relating to validating data on the secondary storage subsystem according to one embodiment of the present invention.

FIG. 4 illustrates a process 400 relating to validating data on the secondary storage subsystem 100b according to one embodiment of the present invention. The process 400 uses PREPARE and VALIDATE states or phases. In the PREPARE phase, all the secondary storage subsystem performs any necessary operation to validate the data received from the intermediate storage subsystem 100c, while keeping recovery information to roll back the operation. If there is a condition which prevents the secondary storage subsystem 100b proceeding with the process 400, it rolls back the operation using the recovery information. In the VALIDATE phase, the secondary storage subsystem 100b validates the data and discards the recovery information. These two phases and the recovery mechanisms are useful since the validation process 400 for given data may fail on any one of the secondary storage subsystems 100b.

The process 400 is invoked at predetermined time intervals at the intermediate subsystem according to one embodiment (step 401). The valid counter 122 is checked to determine whether or not the value has changed since the previous process (step 402). If the value has not changed, the process returns to step 401 and sleeps for a predetermined time. The unchanged value of the valid counter 122 indicates that no write data has been send to the secondary subsystems since the previous session. If the value has been changed, the process proceeds forward.

The intermediate storage subsystem 100c sends PREPARE request to all the secondary storage subsystems 100b along with the current value of the valid counter 122 (step 403). This request prompts the secondary storage subsystems 100b to commence validating data with the sequence number less than or equal to the value of the valid counter 122. The intermediate storage subsystem 100c then waits until acknowledgements from the secondary storage subsystems 100b are received (step 406).

At the secondary subsystems, upon receiving the PREPARE request, the subsystems proceed to validate the data that have been marked as INVALID and assigned sequence numbers that are less than or equal to the current value of the valid counter (step 405). The current value may also be referred as a reference value. The data are marked as PREPARED (step 410). The above step includes copying data from a temporary area of the non-volatile storage to a permanent area, freeing the temporary area, freeing the control data, and updating information relating to the INVALID and PREPARED statuses.

In order to keep the data recoverable, the secondary storage subsystem does not overwrite the old data and keeps them until new data has been validated. One method is to not writing the new data to the final target of the permanent storage (e.g., disks). The secondary storage subsystem 100*b* marks the data as PREPARED once the above steps have been successfully performed.

The secondary subsystem determines whether or not all identified write data have been marked as PREPARED (step 415). If so, the secondary storage subsystem 100*b* sends acknowledgement to the intermediate storage subsystem 100*c* to indicate that all identified write data have been marked as PREPARED (step 420). The secondary storage subsystem 100*b* also sets the timer to wait for the VALIDATE request to be received from the intermediate storage subsystem 100*c* (step 421).

When the intermediate storage subsystem 100*c* receives the acknowledgements from all the secondary storage subsystems 100*b* indicating the all identified write data have been marked PREPARED, the intermediate subsystem sends VALIDATE requests to the secondary storage subsystems 100*b* (step 425). The intermediate subsystem then waits to receive acknowledgements from the secondary subsystems on the VALIDATE requests (step 426).

At the secondary subsystems, each subsystem updates the write data that have been marked as PREPARED to VALID and discards information relating to the recovery of data (step 430). The old data is generally discarded at this time. Each of the secondary subsystems then sends an acknowledgement to the intermediate storage subsystem 100*c* (step 435).

Referring back to step 415, if not all write data have been marked PREPARED, a FAILURE notification is sent to the intermediate subsystem at step 415. The intermediate subsystem then performs an error handling procedure (step 424), which is described in more details below.

The process 400 is used to validate write data with sequence numbers less than or equal to a reference sequence number, i.e., the value of the valid counter 122. That is, a set of SVOLs 101*b* in the secondary storage subsystems 100*b* is consistent across the SVOLs 101*b* and there is no "missing" write data since the secondary subsystems have indicated that all data that has been transmitted with sequence numbers less than or equal to the reference sequence number have received and validated.

In certain situation, the process 400 may fail and recovery procedure may be required. An example of the failure is step 424 where a failure has occurred during PREPARING of the write data. The recovery procedure is performed by the intermediate subsystem in the present embodiment.

Generally, the intermediate storage subsystem is notified of the failure by either receiving an error notification as in step 424 or by timing out after sending a request to the secondary subsystems, e.g., at step 406 or 426.

If a failure occurs during the PREPARE phase, the intermediate storage subsystem 100*c* sends the an ABORT request to the secondary storage subsystems 100*b*, which then perform a rollback operation, where a recovery of the write data that have been mark PREPARED is initiated by marking the write data and their control data as INVALID.

During the VALIDATE phase, a failure may occur if an acknowledgement is not received from the secondary subsystem in a predetermined time. Although such an incident is very unlikely to occur, if it does occur, the intermediate subsystem resends the VALIDATE request.

If a failure occurs because the intermediate storage subsystem 100*c* goes down during either PREPARE or VALIDATE phase, the secondary storage subsystem 100*b* waits for a command from the rebooted intermediate storage subsystem 100*c* or one of the hosts 100. Generally, the rebooted or recovered intermediate storage subsystem 100*c* restarts the process 400 at the last successfully completed step rather than starting from the beginning.

Figure 8:
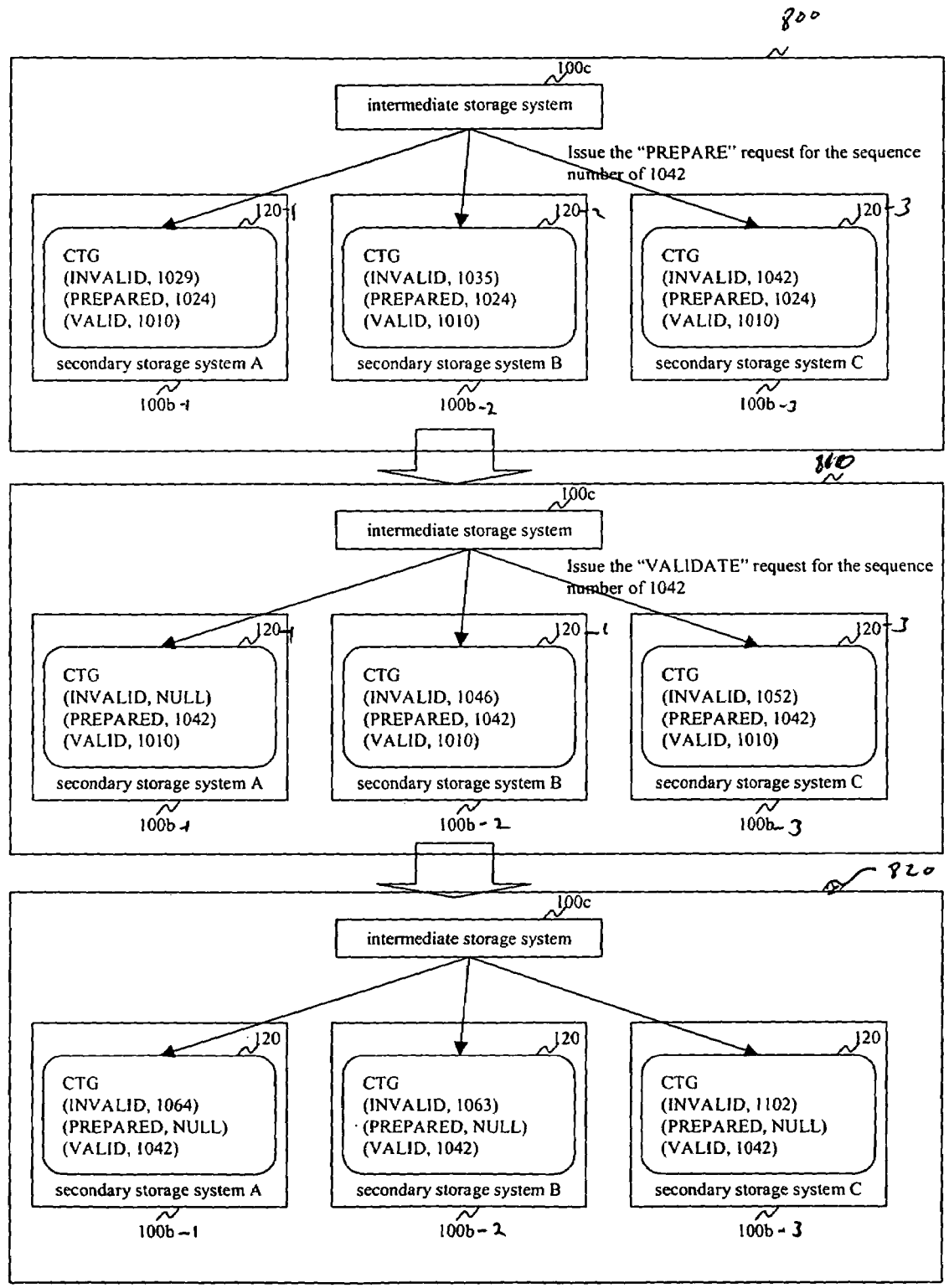
FIG. 8 illustrates a process flow for the process that has been successfully performed without any failure according to one embodiment of the present invention.

FIG. 8 illustrates a process flow for the process 400 that has been successfully performed without any failure according to one embodiment of the present invention. The intermediate subsystem 100*c* issues PREPARE requests to the secondary subsystems 100*b*-1, 100*b*-2, and 100*b*-3, as illustrated by a first state 800. The PREPARE requests ask the secondary subsystems to PREPARE write data with sequence numbers up to 1042.

At the first state 800 prior to receiving the PREPARE requests, the first, second and third consistency groups 120-1, 120-2 and 120-3 of the secondary subsystems 100*b* indicate that all write data with sequence numbers up to 1024 have been PREPARED. All write data with sequence numbers up to 1010 have been VALIDATED. The write data with a sequence number higher than 1024 is indicated as INVALID. For example, the first consistency group 120-1 indicates that the subsystem 100*b*-1 has write data with a sequence number 1029 that is INVALID.

A second state 810 illustrates the consistency groups after the PREPARE requests have been completed. The first consistency group 120-1 indicates that the write data with a sequence number up to 1042 has been PREPARED. Accordingly, the write data with the sequence number 1029 is no longer INVALID, so the consistency group 120-1 indicates that the subsystem 100*b*-1 has no INVALID write data. The consistency group continues to indicate that the write data with a sequence number up to 1010 has been VALIDATED.

The intermediate storage subsystem 100*c* sends VALIDATE requests to the secondary subsystems and the PREPARED write data are VALIDATED according to the requests. A third state 820 illustrates the consistency groups after the VALIDATED requests have been implemented by the secondary subsystems 10*b*. The consistency groups indicate that all write data that have been PREPARED are VALIDATED. That is, all write data with sequence numbers up to 1042 have been VALIDATED.

Figure 9:
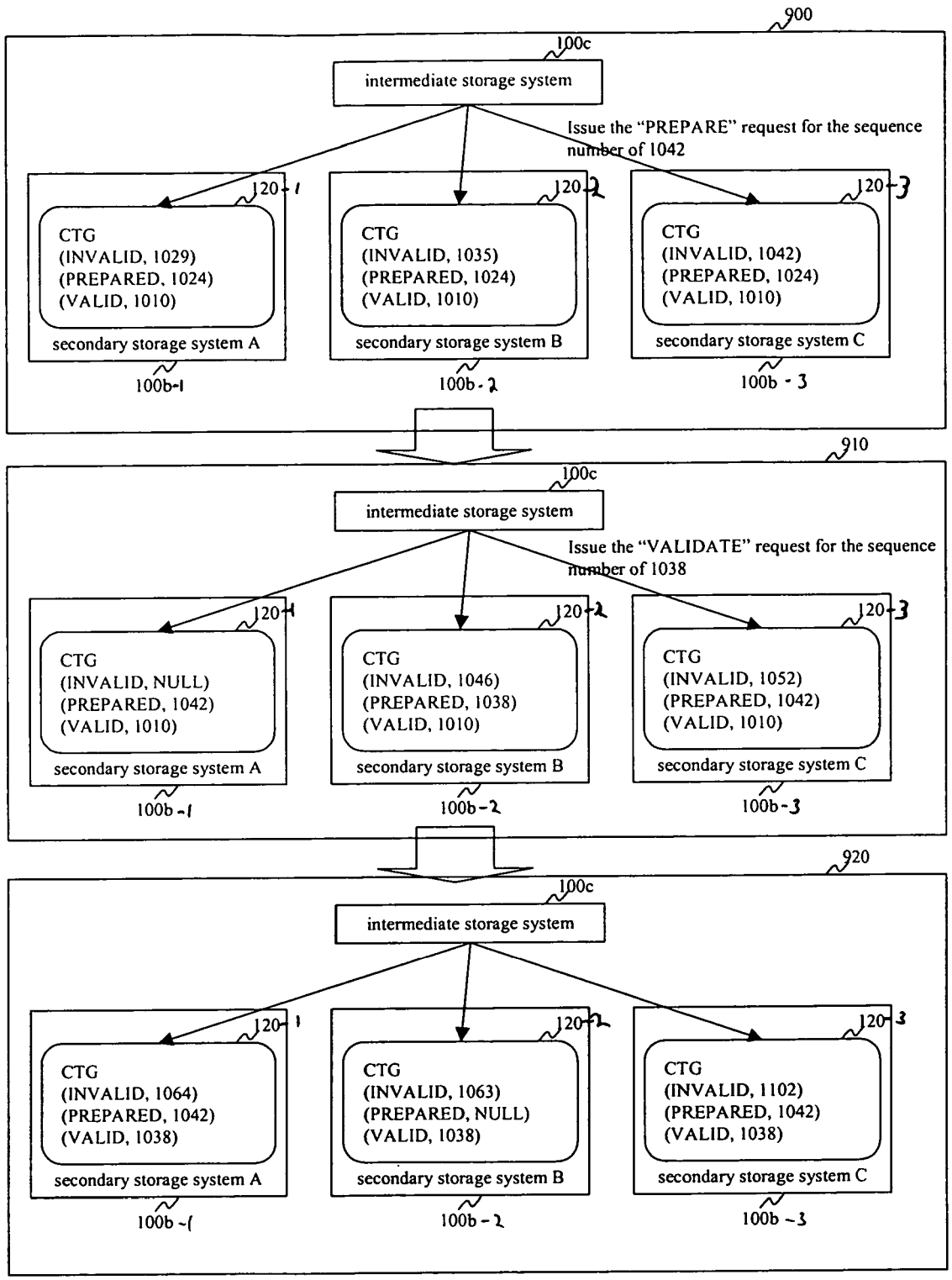
FIG. 9 illustrates a process flow for the process if a failure occurs during the process.

FIG. 9 illustrates occurrence of failure during the process 400. A first state 900 is a mirror image of the first state 800 in FIG. 8. The intermediate subsystem 100*c* issues PREPARE requests to the secondary subsystems 10*b*.

A second state 910 indicates that the PREPARE operation was not performed successfully at one of the secondary subsystems, i.e., the secondary subsystem 100*b*-2. The secondary subsystem 100*b*-2 was not able to successfully PREPARE all of the requested write data, i.e., those with sequence numbers up to 1042. The consistency group 120-2 of the secondary subsystem 100*b*-2 indicates that only write data with sequence numbers up to 1038 have been PREPARED. The PREPARING operations, however, were successfully performed in the secondary subsystems 100*b*-1 and 100-*b*3. Their consistency groups indicate "PREPARED 1042."

As a result of the failure at the secondary subsystem 100*b*-2, the intermediate subsystem issues VALIDATE requests to the secondary subsystems with a reference sequence number of 1038, rather than 1042. The VALIDATE requests have been modified to reflect the problem experienced by the second subsystem 100*b*-2 in PREPARING the write data.

A third state 920 indicates that the modified VALIDATE requests have been successfully implemented by the secondary subsystems 100*b*. The consistency groups 120-1 and 120-3 indicate that they still have write data that have been PREPARED but not VALIDATED. The consistency group 120-2 indicates, however, all PREPARED data have been VALIDATED. The write data that have been VALIDATED are indicated as being those with sequence numbers up to 1038.

Figure 10A:
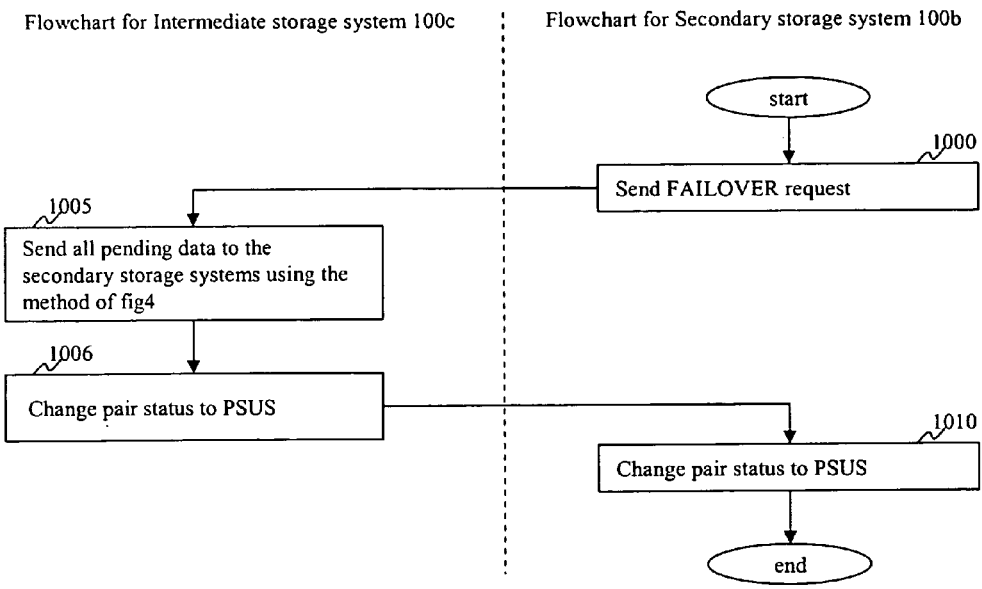
FIG. 10A illustrates a fail-over operation where only the primary site is unavailable and the intermediate storage subsystem remains available.
Figure 10B:
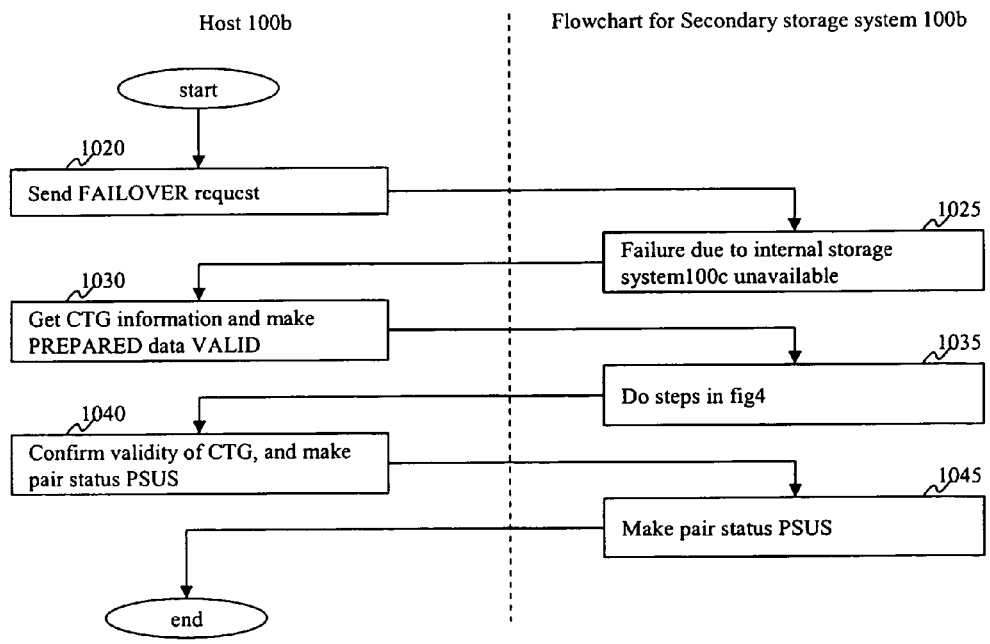
FIG. 10B illustrates a fail-over operation where the intermediate storage subsystem is unavailable.

FIGS. 10A and 10B illustrate a fail-over operation from a primary site to a secondary site according to one embodiment of the present invention. A fail-over is performed when a primary site becomes unavailable to users. This occurs if the primary storage subsystem 100*a* or primary host 110*a*, or both become unavailable. If the primary site experiences a failure or is temporarily taken off the line for maintenance, the secondary site is made available to run application.

Generally, the volumes in the secondary subsystem or SVOLs 101*b* are not writeable while it is paired or mirrored to the primary storage subsystem 100*a*. The fail-over operation, accordingly, involves suspending the mirroring with the primary subsystem according to one embodiment.

FIG. 10A illustrates a fail-over operation where only the primary site is unavailable and the intermediate storage subsystem 100*c* remains available. Under this scenario, no data is lost since the IVOLs 101*c* retains all data received from the primary subsystems. These data are transmitted to SVOLs 101*b* by the intermediate storage subsystem 100*c*. The secondary subsystems are made available thereafter.

At beginning, a user invokes a fail-over operation using a secondary host 100*b* (step 1002). The secondary storage subsystem 100*b* sends a FAILOVER request to the intermediate storage subsystem 100*c*. The intermediate storage subsystem 100*c* sends all the pending data to the secondary storage subsystem 100*b* (step 1005). In one embodiment, the process 300 is used to send the data from the intermediate subsystem to the secondary subsystem. Synchronous copy from the primary storage subsystem 100*a* to the intermediate storage subsystem 100*c* may continue. These data are transmitted to the secondary subsystem subsequently. The intermediate subsystem changes its pair status to PSUS once all pending data have been sent to the secondary subsystem (step 1006). PSUS indicates that the pair status has been suspended. Once the secondary subsystem is notified of the completion of the FAILOVER request, the secondary storage subsystem 100*b* changes its pair status to PSUS (step 1010).

FIG. 10B illustrates a fail-over operation where the intermediate storage subsystem 100*c* is unavailable. The primary site may or may not be unavailable. In this situation, data may be lost since the intermediate subsystem may have data that have not been sent to the secondary storage subsystem 100*b*. A user invokes a fail-over operation using the secondary host 100*b*, thereby sending a FAILOVER request to the secondary subsystem (step 1020). Since the intermediate storage subsystem 100*c* is unavailable, the FAILOVER request fails and the secondary storage subsystem 100*b* returns error message to the secondary host (step 1025).

The secondary host 110*b* obtains certain information from the consistency groups of all of the secondary storage subsystems (step 1030). The information includes the sequence number of INVALID data, the sequence number of PREPARED data, and the sequence number of VALID data. All PREPARED data are made to be VALID data using the process 400 (step 1035).

The secondary host 110*b* initiates changing of the pair status to PSUS in the secondary storage subsystem 100*b* after confirming that the validation process has been performed successfully (step 1040). The status of the secondary subsystem is changed to PSUS (step 1045).

As explained above, the remote copy system 50 has three data centers. Data will not be lost unless both the primary and intermediate subsystems fail at the same time. Data consistency may be guaranteed even if the primary and secondary data centers are each provided a plurality of subsystems. The intermediate subsystem receives all write data from the primary subsystems and relay them to the secondary subsystems. The intermediate subsystem generates administrative information (e.g., sequence number) needed keep the write order of the write data received from the plurality of primary subsystems.

Figure 6:
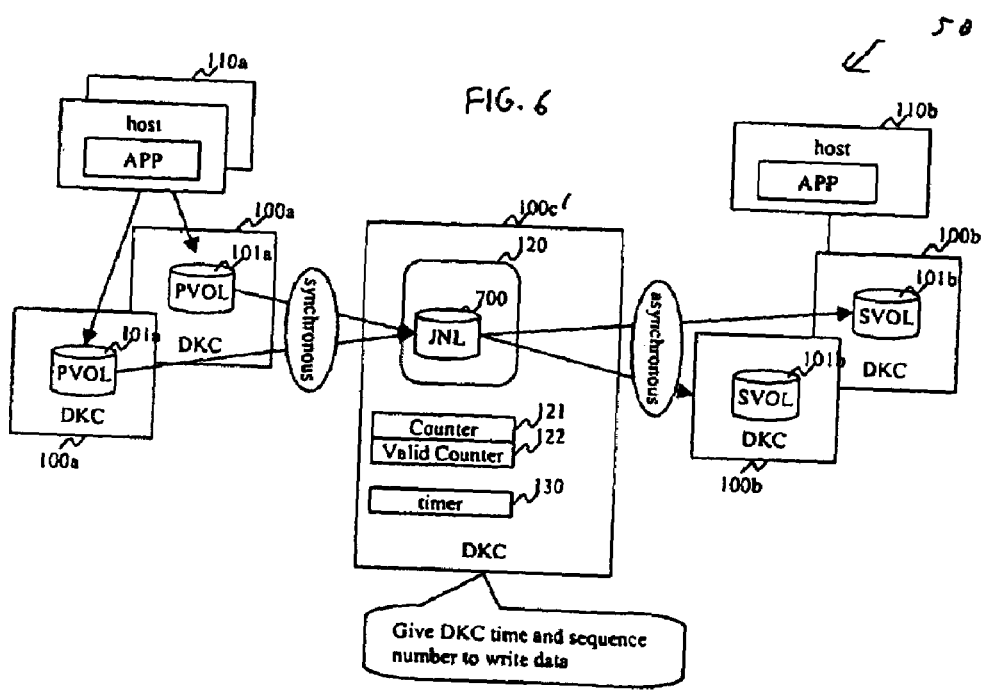
FIG. 6 illustrates a remote copy system according to another embodiment of the present invention.

FIG. 6 illustrates a remote copy system 50' according to another embodiment of the present invention. The system 50' has a reduced number of volumes in an intermediate storage subsystem 100*c'* compared to the system 50 of FIG. 1. If the application does not fail over to the intermediate storage subsystem, the intermediate system may have a less number of volumes than the primary volumes at the primary site. Reducing the number of volumes reduces costs. The intermediate storage subsystem 100*c'* is provided with one volume to store data received from the primary storage subsystem 100*a*. In one embodiment, the intermediate storage subsystem 100*c'* has no volume and uses a cache memory to temporarily store the data.

The intermediate storage subsystem 100*c'* includes a journal volume (JNLVOL) 700. JNLVOL 700 corresponds to IVOL 101*c*. Unlike IVOL100*c* in the system 50, JNLVOL 700 is not a mirror of PVOL101*a*. JNLVOL 700 servers as a buffer or temporarily storage area for the write data and its control data that have been received from the primary storage subsystem 100*a*, as explained in more detail in U.S. patent application Ser. No. 10/602,223, entitled, "REMOTE COPY SYSTEM," filed on Jun. 23, 2003, which is incorporated by reference.

Figure 7:
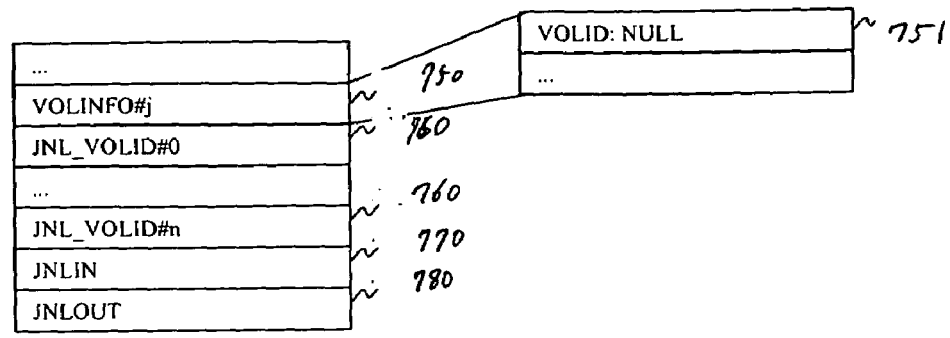
FIG. 7 illustrates a consistency group table for the remote system according to one embodiment of the present invention.

FIG. 7 illustrates a consistency group table 702 for the remote system 50' according to one embodiment of the present invention. The consistency group table 702 includes a volume information (VOLINFO#) 750, journal volume information (JNL_VOLID#) 760, journal-in information (JNLIN) 770, and journal-out information (JNLOUT) 780. VOLINFO# 750 includes a volume ID (VOLID) 451 stores NULL to indicate that there is no IVOL 101*c* defined in the intermediate storage subsystem 100*c*. Similarly, PAIR-VOLID (not shown) defined in the primary storage subsystem 100*a* and the secondary storage subsystem 100*b* contains NULL to indicate that there is no related IVOL 101*c* defined in the intermediate storage subsystem.

JNL_VOLID 760 includes volume identification information of a volume that is used for storing control data and write data sent from the primary storage subsystem 100*a*. JNLIN 770 includes the identifier for JNL_VOLID 760 entry and the address in the journal volume 700. JNLIN 770 represents the address to which the next set of write data and its control data is be stored. JNLOUT 780 contains the identifier for JNL_VOLID 760 entry and the address in the journal volume 700. JNLOUT 780 represents the address to which the next set of write data and its control data will be sent to the secondary storage subsystem 100*b*. If there is no valid JNL_VOLID 760 entry (e.g., all JNL_VOLIDs 760 are NULL), then no journal volume 700 has been allocated to the consistency group.

For the remote system 50', a synchronous copy operation is performed using a process that is substantially the same as the process 200 of FIG. 2. One of the differences relates to step 220, where a non-volatile storage is selected by referring to the consistency group table. This operation involves: (1) checking to determine if there is IVOL 101c (VOLID451 ! = NULL) and JNLVOL 700 (JNL_VOLID460 !=NULL); and (2) based on result of (1), perform the following procedure:

store the write data and its control data received from the primary storage subsystem 100a to a cache memory of the intermediate storage subsystem 100c, and if there is JNLVOL 700, store the write data and its control data to the address on the JNLVOL 700 as specified by JNLIN 770, and if there is IVOL 101c, store the write data to IVOL 101c.

Generally, the intermediate storage subsystem 100c sends acknowledgement to the primary storage subsystem 100a upon storing the write data to the cache memory in order to expedite the synchronous copy operation.

The remote copy system 50' also performs an asynchronous remote copy system operation using a process that is substantially the same as the process 300 of FIG. 3. One of the differences involves step 301 of FIG. 3, where the data is selected to be sent to the secondary storage subsystem 100b as follows:

(1) check to determine if there is IVOL 101c (VOLID 451 ! =NULL) and JNLVOL 700 (JNL_VOLID460 ! = NULL); and (2) based on result of (1), perform the following procedure select the data that has the lowest sequence number from the cache memory, and if the data does not exist in the cache memory, and there is JNLVOL 700, retrieve the data from JNLVOL 700. If JNLVOL700 does not exist, the secondary storage subsystem cannot maintain mirroring, and bring the status to PSUS.

The remote system 50' enables reduction of the number of volumes in the intermediate storage subsystem 100c by (1) storing write data sent from the primary storage subsystem 100a and its control data only to a non-volatile random area memory (NVRAM), and (2) storing the write data and its control data to JNLVOL 700. If only NVRAM is used, no volume is necessary at the intermediate subsystem. Such a configuration may make it difficult to keep a mirror of the primary volumes since the capacity of NVRAM is limited (e.g., several GB) and would be expensive to increase the NVRAM capacity. Use of JNLVOL 700 in combination with NVRAM is a more affordable solution since write data and its control data may be stored to JNLVOL700. The latter configuration would still require less number of volumes than that having IVOLs 101c.

Figure 11:
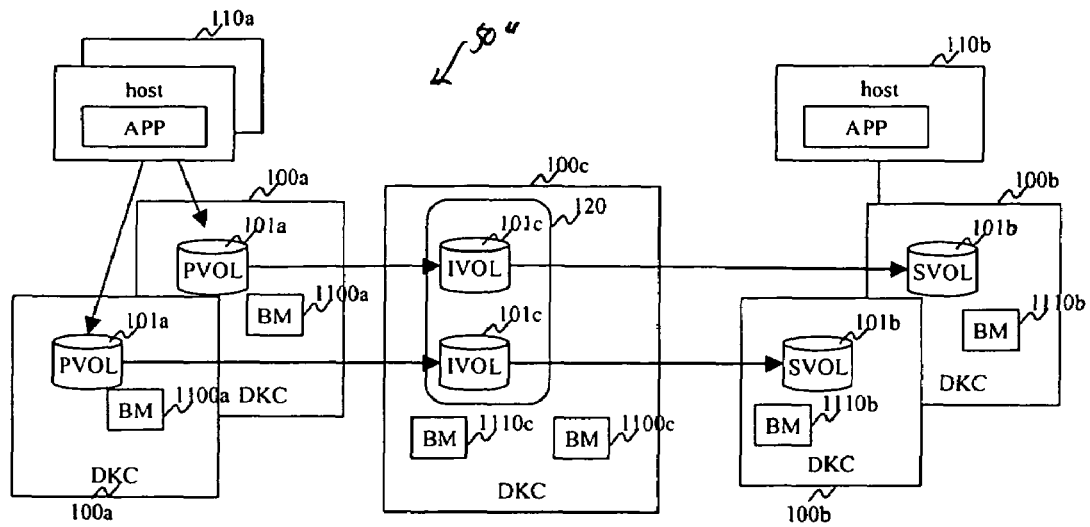
FIG. 11 illustrates a remote copy system configured to minimize resynchronization time after suspension of mirroring according to one embodiment of the present invention.

FIG. 11 illustrates a remote copy system 50" configured to minimize resynchronization time after suspension of mirroring according to one embodiment of the present invention. The system 50" includes a plurality of bitmaps 100a provided in the primary storage subsystems, a plurality of bitmaps 1110b provided in the secondary storage subsystems, and a bitmap 1100c and bitmap 1100c provided in the intermediate storage subsystem.

Generally, mirroring is suspended if the connection between the primary and intermediate subsystems fails or is manually terminated or the connection between the secondary and intermediate subsystems fails or is manually terminated. The mirroring is resumed or re-synchronized when the failures has been recovered or a user specifies resynchronization for the suspended mirror volumes. During resynchronization, only data that have been changed since the suspension are copied from the primary to the secondary subsystems to minimize the resynchronization time. The present embodiment uses the bitmaps for this purpose. Similarly, only data that has been changed since the suspension are copied from the intermediate subsystems to the secondary subsystems.

Two bitmaps are provided for each pair of mirror volumes. The bitmaps 1100 are assigned to primary volumes, and the bitmaps 1110 are assigned to secondary volumes. Accordingly, the bitmap 1100a is assigned to each of the primary volumes in the primary subsystems according to the present embodiment. A corresponding bitmap 1110c is assigned to the "secondary volumes" (or intermediate volumes 101c functioning as a secondary volume) in the intermediate subsystem.

The intermediate subsystem also includes the bitmap 1100c since its volume are "primary volume" with respect to the volumes in the secondary subsystems. The secondary subsystems include the bitmaps 1110b that correspond to the bitmap 1100c of the intermediate subsystem.

The bitmaps 1100 and 1110 keep track of changes made on the volumes after the suspension of mirror. The bitmaps are activated only if the corresponding mirror is suspended. For example, if only the mirror (PVOL 101a, IVOL 101c) is suspended, then the bitmap 1100a of PVOL 101a and the bitmap 1110c of IVOL 101c are activated while the bitmap 1100c of IVOL 101c and the bitmap 1110b of SVOL 101b remain inactive.

Figure 12:
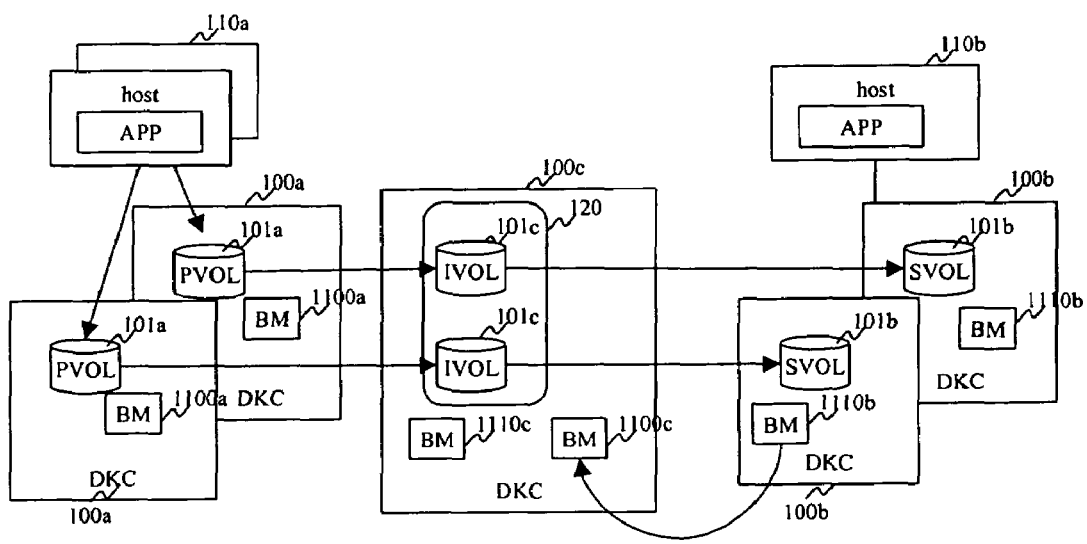
FIG. 12 illustrates the mirroring of PVOL 101a and IVOL101c and suspension of mirror of IVOL 101c and SVOL101b.

The resynchronization involves transferring all active bitmaps to the source storage subsystem 100 of resynchronization and then merged (ORed). The source subsystem may be the primary subsystem or the intermediate subsystem according to the application. The source storage subsystem of resynchronization then copies data based on the merged bitmap. For example, in FIG. 12, which illustrates the mirroring of PVOL 101a and IVOL 101c and suspension of the mirror of IVOL 101c and SVOL101b. The resynchronization involves obtaining the bitmap 1110b of the secondary subsystem at the intermediate storage subsystem 101c and merging (OR) it to the bitmap 1110c of IVOL 101c. The differential data based on the merged bitmaps are copied from IVOL 101c to SVOL 101b. The first mirror (PVOL 101a and IVOL 01c) may be resynchronized independently of the second mirror (IVOL 101c and SVOL 101b) since two different sets of bitmaps are provided in the remote copy system 50".

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A remote copy system, comprising:

first and second primary storage subsystems, the first primary storage subsystem including a first primary volume, the second primary storage subsystem including a second primary volume, the first and second primary volumes storing a plurality of write data in a given order;

an intermediate storage subsystem coupled to the first and second primary storage subsystems and configured to synchronously receive the write data from the first and second primary storage subsystems, the intermediate storage subsystem including a write-order-information provider that is configured to generate write-order information for the write data received from the first and second primary storage subsystems, the write-order information provider comprising a counter that generates a sequence number forming part of the write-order information, the write-order information being associated with the write data received from the first and second primary storage subsystems, the write-order information reflecting the given order of storage of the write data in the first and second primary storage subsystems, wherein the intermediate storage subsystem includes first and second intermediate volumes defined as a consistency group within which data integrity is guaranteed, the first intermediate volume being configured to receive the write data from the first primary volume, the second intermediate volume being configured to receive the write data from the second primary volume;

first and second secondary storage subsystems coupled to the intermediate storage subsystem and configured to asynchronously receive the write data from the intermediate storage subsystem, the first secondary storage subsystem including a first secondary volume that is configured to mirror the first primary volume of the first primary storage subsystem which is a separate storage subsystem from the intermediate storage subsystem, the second secondary storage subsystem including a second secondary volume that is configured to mirror the second primary volume of the second primary storage subsystem which is a separate storage subsystem from the intermediate storage subsystem, wherein the write data are stored in the first and second secondary storage subsystems according to the write order information associated with the write data as generated by the write-order-information provider of the intermediate storage subsystem which is a separate storage subsystem from the first primary storage subsystem having the first primary volume and the second primary storage subsystem having the second primary volume; and a valid counter forming part of the intermediate storage subsystem, the valid counter being configured to keep the highest sequence number of the write data that is ready to be validated for copying at the secondary subsystems, wherein the intermediate storage subsystem transmits a request to prepare the write data and transmits a request to validate the write data which has been prepared according to the prepare request, based on a value of the valid counter.

2. The remote copy system of claim 1, further comprising:
first and second primary bitmaps provided at the first and second primary subsystems, respectively;
first and second intermediate bitmaps provided at the intermediate subsystem; and first and secondary bitmaps provided at the first and second secondary subsystems, respectively,
wherein the first and second primary bitmaps are associated with the first intermediate bitmap and the first and second secondary bitmaps are associated with the second intermediate bitmap,
wherein the bitmaps are used during a resynchronization process to determine and copy only data have been changed suspension of mirroring of a paired volumes.

3. The remote copy system of claim 1, wherein the intermediate subsystem including a journal volume to receive the write data from the first and second primary subsystems.

4. The remote copy system of claim 1, wherein the first and second primary subsystems are disk array units.

5. The remote copy system of claim 1, wherein the primary subsystems are provided at a primary site and the secondary subsystems are provided at a secondary site, the primary site including a primary host, the secondary site including a secondary host,
wherein the secondary subsystems are configured to replace the primary subsystems as primary storage areas if either the primary subsystems or the primary host experiences failure or is taken off line.

6. A method for operating a remote copy system, the method comprising:
receiving first write data from a first primary storage subsystem at an intermediate storage subsystem which is a separate storage subsystem from the first primary storage subsystem, the first write data being sent by the first primary subsystem synchronously;
associating first write order information to the first write data at the intermediate storage subsystem, the intermediate storage subsystem including intermediate volumes defined as a consistency group within which data integrity is guaranteed;
receiving second write data from a second primary storage subsystem at the intermediate subsystem which is a separate storage subsystem from the second primary storage subsystem, the second write data being sent by the second primary subsystem synchronously;
associating second write order information to the second write data at the intermediate storage subsystem;
transmitting asynchronously the first write data and the first write order information to a first secondary storage subsystem which is a separate storage subsystem from the intermediate storage subsystem;
transmitting asynchronously the second write data and the second write order information to a second secondary storage subsystem which is a separate storage subsystem from the intermediate storage subsystem;
transmitting a request to prepare the first, second, and third write data for storage in the first and second secondary subsystems, the prepare request being transmitted to the first and second secondary subsystems from the intermediate subsystem, the prepare request including a reference sequence number; and
transmitting a request to validate the write data that have been prepared according to the prepare request, the validate request being transmitted to the first and second secondary subsystems from the intermediate subsystem and identifying the write data to be prepared,
validating the write data with the sequence numbers that are less than or equal to the reference sequence number;
wherein the first and second write data are stored in the first and second secondary subsystems, respectively, according to the first and second write order information, and
wherein the intermediate storage subsystem is not directly coupled to a host unit.

7. The method of claim 6, further comprising:
receiving synchronously third write data from the first primary subsystem at the intermediate storage subsystem, the third write data being received at the intermediate subsystem after the first write data;
associating the third write data with third write order information;
transmitting asynchronously the third write data and the third write order information to the first secondary subsystem,
wherein the first and third write data have the same destination address, the destination address identifying a storage area in the first secondary subsystem, wherein the first and third write order information is used to store the first write data to the identified storage area prior to storing the third write data to the identified storage area.

8. An intermediate storage subsystem provided in a remote copy system and coupled to a plurality of primary storage subsystems and coupled to a plurality of secondary subsystems, the intermediate storage subsystem comprising:

a first intermediate storage area configured to receive write data from at least one primary subsystem which is a separate storage subsystem from the intermediate storage subsystem, the write data being received synchronously from the at least one primary subsystem, the first intermediate storage area defined as a consistency group with which data integrity is guaranteed;

a write-order-information provider configured to generate write-order information for the write data received from the at least one primary subsystem, the write-order information being associated with the write data;

a valid counter provided in the intermediate subsystem, the valid counter being configured to keep the highest sequence number of the write data that is ready to be validated for copying at the secondary subsystems; and a second intermediate storage area, wherein the write-order information is used to store the write data in at least one of the secondary subsystems which is a separate storage subsystem from the intermediate storage subsystem, so that the at least one secondary subsystem mirrors the at least one primary subsystem, wherein the intermediate storage subsystem transmits a request to prepare the write data and transmits a request to validate the write data which has been prepared according to the prepare request, based on a value of the valid counter wherein the plurality of primary subsystems include a first primary volume provided in a first primary subsystem, and a second primary volume provided in a second primary subsystem, wherein the first and second intermediate storage areas are first and second intermediate volumes, the first intermediate volume being configured to receive write data from the first primary volume and the second intermediate volume being configured to receive write data from the second primary volume, wherein the first intermediate volume is configured to send the write data received from the first primary volume to a first secondary volume provided in a first secondary subsystem and the second intermediate volume is configured to send the write data received from the second primary volume to a second secondary volume provided in a second secondary subsystem, and wherein the intermediate storage subsystem is not directly coupled to a host unit.

9. The storage subsystem of claim 8, wherein the first storage area is configured to receive first and second write data from the at least one primary subsystem in a given order, the first and second write data being provided with first and second write order information, respectively, by the intermediate subsystem, wherein the first and second write data are stored in the at least one secondary subsystem according to the given order using the first and second write order information.

10. The storage subsystem of claim 8, wherein the write-order-information provides is a counter configured to generate sequence numbers, the generated sequence numbers being associated with the write data according to an order the write data are received from the at least one primary subsystem.

11. The storage subsystem of claim 8, wherein the first storage area is a journal volume that is configured to receive write data from the plurality of primary subsystems.

12. An intermediate storage subsystem provided in a remote copy system and coupled to a plurality of primary storage subsystems and coupled to a plurality of secondary subsystems, the intermediate storage subsystem comprising:

a first intermediate storage area configured to receive write data from at least one primary subsystem which is a separate storage subsystem from the intermediate storage subsystem, the write data being received synchronously from the at least one primary subsystem, the first intermediate storage area defined as a consistency group with which data integrity is guaranteed;

a write-order-information provider configured to generate write-order information for the write data received from the at least one primary subsystem, the write-order information being associated with the write data;

a valid counter provided in the intermediate subsystem, the valid counter being configured to keep the highest sequence number of the write data that is ready to be validated for copying at the secondary subsystems; and a second intermediate storage area, wherein the write-order information is used to store the write data in at least one of the secondary subsystems which is a separate storage subsystem from the intermediate storage subsystem, so that the at least one secondary subsystem mirrors the at least one primary subsystem, wherein the intermediate storage subsystem transmits a request to prepare the write data and transmits a request to validate the write data which has been prepared according to the prepare request, based on a value of the valid counter wherein the plurality of primary subsystems include a first primary volume provided in a first primary subsystem, and a second primary volume provided in a second primary subsystem, wherein the first and second intermediate storage areas are first and second intermediate volumes, the first intermediate volume being configured to receive write data from the first primary volume and the second intermediate volume being configured to receive write data from the second primary volume, and wherein the first intermediate volume is configured to send the write data received from the first primary volume to a first secondary volume provided in a first secondary subsystem and the second intermediate volume is configured to send the write data received from the second primary volume to a second secondary volume provided in a second secondary subsystem;

first and second primary bitmaps provided at the first and second primary subsystems, respectively;

first and second intermediate bitmaps provided at the intermediate subsystem; and first and second secondary bitmaps provided at the first and second secondary subsystems, respectively, wherein the first and second primary bitmaps are associated with the first intermediate bitmap and the first and second secondary bitmaps are associated with the second intermediate bitmap, wherein the bitmaps are used during a resynchronization process to determine and copy only data have been changed since suspension of mirroring of a paired volumes, and wherein the intermediate storage subsystem is not directly coupled to a host unit.

13. The storage subsystem of claim 12, wherein the first and second secondary volumes are configured to mirror the first and second primary volumes, respectively, wherein the write data are received from the primary subsystems at the intermediate subsystem synchronously, wherein the write data are transmitted to the secondary subsystem from the intermediate subsystem asynchronously.

14. The storage subsystem of claim 12, wherein the intermediate storage subsystem is a disk array unit.

* * * * *